(12) United States Patent  (10) Patent No.: US 8,047,467 B2
Erickson et al.  (45) Date of Patent: Nov. 1, 2011

(54) INTEGRATED CLOSET SYSTEM

(75) Inventors: Harold Glenn Erickson, Mukilteo, WA (US); Mark Anthony Buchanan, Kirkland, WA (US); Douglas A. Brown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 767 days.

(21) Appl. No.: 12/117,259

(22) Filed: May 8, 2008

(65) Prior Publication Data

US 2009/0278429 A1 Nov. 12, 2009

(51) Int. Cl.
*B64D 9/00* (2006.01)

(52) U.S. Cl. ............... 244/118.1; 244/118.5; 312/265.4

(58) Field of Classification Search .... 244/118.5–118.6, 244/118.1; 312/257.1, 265.4, 258, 287, 350, 312/351.3; 403/172, 231, 382; 220/1.5; 211/183; 52/82, 282.4, 745.13, 793.1
See application file for complete search history.

(56) References Cited

U.S. PATENT DOCUMENTS

| | | | | |
|---|---|---|---|---|
| 3,250,582 A | * | 5/1966 | Kassimir | 312/351.3 |
| 4,057,342 A | * | 11/1977 | Allis | 399/203 |
| 4,544,069 A | * | 10/1985 | Cavallini | 403/172 |
| 4,558,797 A | * | 12/1985 | Mitchell | 52/282.4 |
| 4,782,637 A | * | 11/1988 | Eriksson et al. | 403/172 |
| 4,993,574 A | * | 2/1991 | King et al. | 220/1.5 |
| 5,020,866 A | * | 6/1991 | McIlwraith | 312/265.4 |
| 5,083,727 A | * | 1/1992 | Pompei et al. | 244/118.5 |
| 5,467,562 A | * | 11/1995 | Holland | 52/79.1 |
| 5,687,513 A | * | 11/1997 | Baloga et al. | 52/32 |
| 6,101,766 A | * | 8/2000 | Mogensen | 244/118.5 |
| 6,350,000 B1 | * | 2/2002 | Van Benthem et al. | 312/257.1 |
| 6,691,952 B2 | * | 2/2004 | Keogh | 244/118.5 |

* cited by examiner

*Primary Examiner* — Galen Barefoot
(74) *Attorney, Agent, or Firm* — Yee & Associates, P.C.

(57) ABSTRACT

A closet comprises a support rail, a light, a raceway, a rub strip, and a hinge unit. The support rail is capable of providing structural support for the closet and having a plurality of connecting elements. The light has a first set of connecting elements capable of being engaged to the plurality of connecting elements. The raceway has a second set of connecting elements capable of being engaged to the plurality of connecting elements. The rub strip has a third set of connecting elements capable of being engaged to the plurality of connecting elements. The hinge unit has a shape capable of being connected to the support rail.

23 Claims, 17 Drawing Sheets

INTEGRATED CLOSET SYSTEM

BACKGROUND INFORMATION

1. Field

The present disclosure relates generally to storage systems and in particular to a method and apparatus for an aircraft storage system. Still more particular, the present disclosure relates to a method and apparatus for a closet within an aircraft.

2. Background

A closet may be an enclosed space, which may be accessed using a door or some other movable barrier. A closet may be used to temporarily store items. In an aircraft, closets may be used to store items, such as, for example, without limitation, baggage, clothing, blankets, pillows, supplies, wheelchairs, emergency equipment, flight crew demonstration equipment, and other suitable items.

In an aircraft, closets may be located in various locations in a passenger cabin of an aircraft. For example, without limitation, a closet may be located as part of a monument dividing seating areas within a passenger cabin, in a gallery, by a door, by a lavatory, and/or some other suitable location. Closets may have different sizes. For example, without limitation, a closet may have a height that extends from the floor into the crown of the aircraft. The closet also may be located under a bin.

An aircraft closet may include, for example, without limitation, panels for walls of the closet, structural corners, and other suitable components used to form the closet, lights, wiring, and molding. With the limited amount of space present in an aircraft, it is desirable to efficiently configure and locate closets to maximize their usability within an aircraft.

Current closet configurations; however, may not efficiently use space within a closet. For example, a light in a closet may be placed in a location that may take up space for storing items. Further, the placement of the light may be in a location providing sub-optimal illumination when placed to increase storage efficiency.

Also, in manufacturing closets, these types of structures may add to the time and cost to manufacture an aircraft. Construction of a closet may require numerous fasteners to attach panels, lights, wiring, rub strips, and other components integrated into the closet. Assembling and attaching these components to each other with mechanical fasteners requires time. Also, as the number of fasteners increases, the amount of time needed to assemble a closet may increase. As a result, the time and cost to install a closet in an aircraft also may increase. This increase in the number of fasteners also may increase the weight of the aircraft.

Accordingly, there is a need for a method and apparatus to overcome the problems discussed above.

SUMMARY

In one advantageous embodiment, a closet comprises a support rail, a light, a raceway, a rub strip, and a hinge unit. The support rail may be capable of providing structural support for the closet and having a plurality of connecting elements. The light may have a first set of connecting elements capable of being engaged to the plurality of connecting elements. The raceway may have a second set of connecting elements capable of being engaged to the plurality of connecting elements. The rub strip may have a third set of connecting elements capable of being engaged to the plurality of connecting elements. The hinge unit may have a shape capable of being connected to the support rail.

In another advantageous embodiment, a method is present for installing a closet. A support rail may be mounted in a location for the closet, wherein the support rail may be capable of providing structural support for the closet and having a plurality of connecting elements. A first set of connecting elements on a light may be moved to engage a first portion of the plurality of connecting elements, wherein the first set of connecting elements may engage to the first portion of the plurality of connecting elements to connect the light to the support rail. A second set of connecting elements on a raceway may be moved to engage a second portion of the plurality of connecting elements, wherein the second set of connecting elements may engage to the second portion of the plurality of connecting elements to connect the raceway to the support rail. A third set of connecting elements on a rub strip may be moved to engage a third portion of the plurality of connecting elements, wherein the third set of connecting elements may engage to the third portion of the plurality of connecting elements to connect the bus trip to the support rail. A hinge unit may be connected to the support rail.

In yet another advantageous embodiment, an aircraft closet comprises a plurality of support rails, a light, a raceway, a rub strip, a hinge unit, a wall panel, a door, and a switch. The plurality of support rails may provide structural support for the closet, wherein the plurality of support rails may have a plurality of connecting elements, wherein tops of the plurality of support rails may be connected to an aircraft structure in an aircraft. The light may have a first set of connecting elements engaged to connecting elements for a selected support rail. The raceway may have a second set of connecting elements engaged to the connecting elements for the selected support rail. The rub strip may have a third set of connecting elements engaged to the connecting elements for the selected support rail, wherein the rub strip may be attached to an exterior side of the selected support rail and may cover the selected support rail from view. The hinge unit may have a shape that may be connected to the selected support rail. The wall panel may be connected to the selected support rail and another support rail in the plurality of support rails. The door may be attached to the hinge unit. The switch may be capable of being actuated to turn on the light when the door is opened and may be capable of turning off the light when the door is closed, wherein the connecting elements may be holes and wherein the first set of connecting elements, the second set of connecting elements, and the third set of connecting elements may be tabs capable of being placed into the holes in a manner that may secure the tabs within the holes when the tabs are engaged with the holes, and wherein the light may have a lip on a first end extending above a surface of the first end, wherein the lip may cover a seam formed between the cover and the light when the cover is adjacent to the first end.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
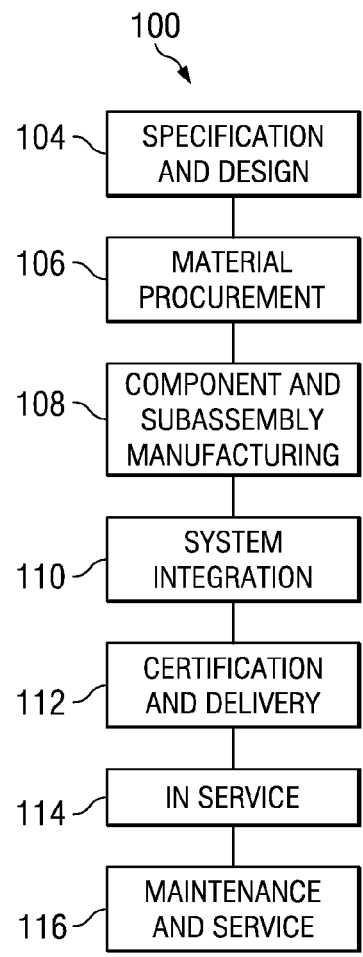
FIG. 1 is a flow diagram of aircraft production and service methodology in accordance with an advantageous embodiment.
Figure 2:
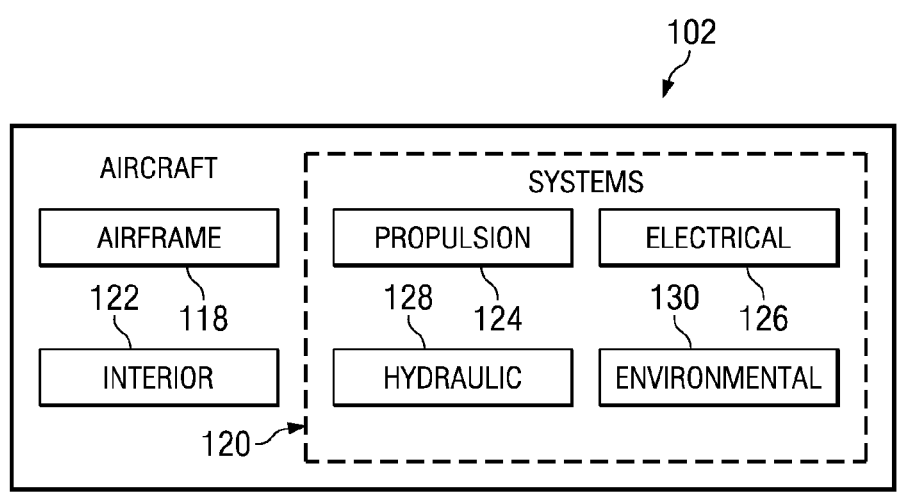
FIG. 2 is a block diagram of an aircraft in accordance with an advantageous embodiment.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the disclosure may be applied to other industries, such as the building industry and/or marine industry.

Apparatus and methods embodied herein may be employed during any one or more of the stages of the production and service method 100. For example, components or subassemblies for closets corresponding to production process 108 may be fabricated or manufactured in a manner similar to components or subassemblies produced while the aircraft 102 is in service.

Also, one or more apparatus embodiments, method embodiments, or a combination thereof may be utilized during the production stages 108 and 110, for example, by substantially expediting assembly of or reducing the cost of an aircraft 102. As one non-limiting example, a closet according to the different advantageous embodiments may be assembled during system integration 110.

Similarly, one or more of apparatus embodiments, method embodiments, or a combination thereof may be utilized while the aircraft 102 is in service, for example and without limitation, to maintenance and service 116.

The different advantageous embodiments recognize that currently existing solutions may employ a nonintegrated approach. With this type of approach, parts, such as, for example, without limitation, lights, light switches, rub strips, wiring, and other suitable closet components may be located in different areas of the closet.

Further, currently existing solutions may require mechanical fasteners to secure the different parts to form the closet. These mechanical fasteners require additional times, torque inspections, and other operations to install. The different advantageous embodiments employ a snap fit technology, which reduces installation time as compared to currently used systems.

The different advantageous embodiments recognize that currently used closet systems may not provide efficient space usage. Further, the advantageous embodiments also recognize that the current closet systems may not allow for reduced time or cost in manufacturing aircraft. Thus, the different advantageous embodiments may integrate various closet features into a corner of the closet.

Additionally, the different advantageous embodiments may reduce installation time through the use of connecting elements instead of currently used mechanical fasteners. Further, the different advantageous embodiments also may provide protected areas for electrical wiring. Also, different advantageous embodiments may provide aesthetics over currently nonintegrated approaches for closet systems.

Figure 3:
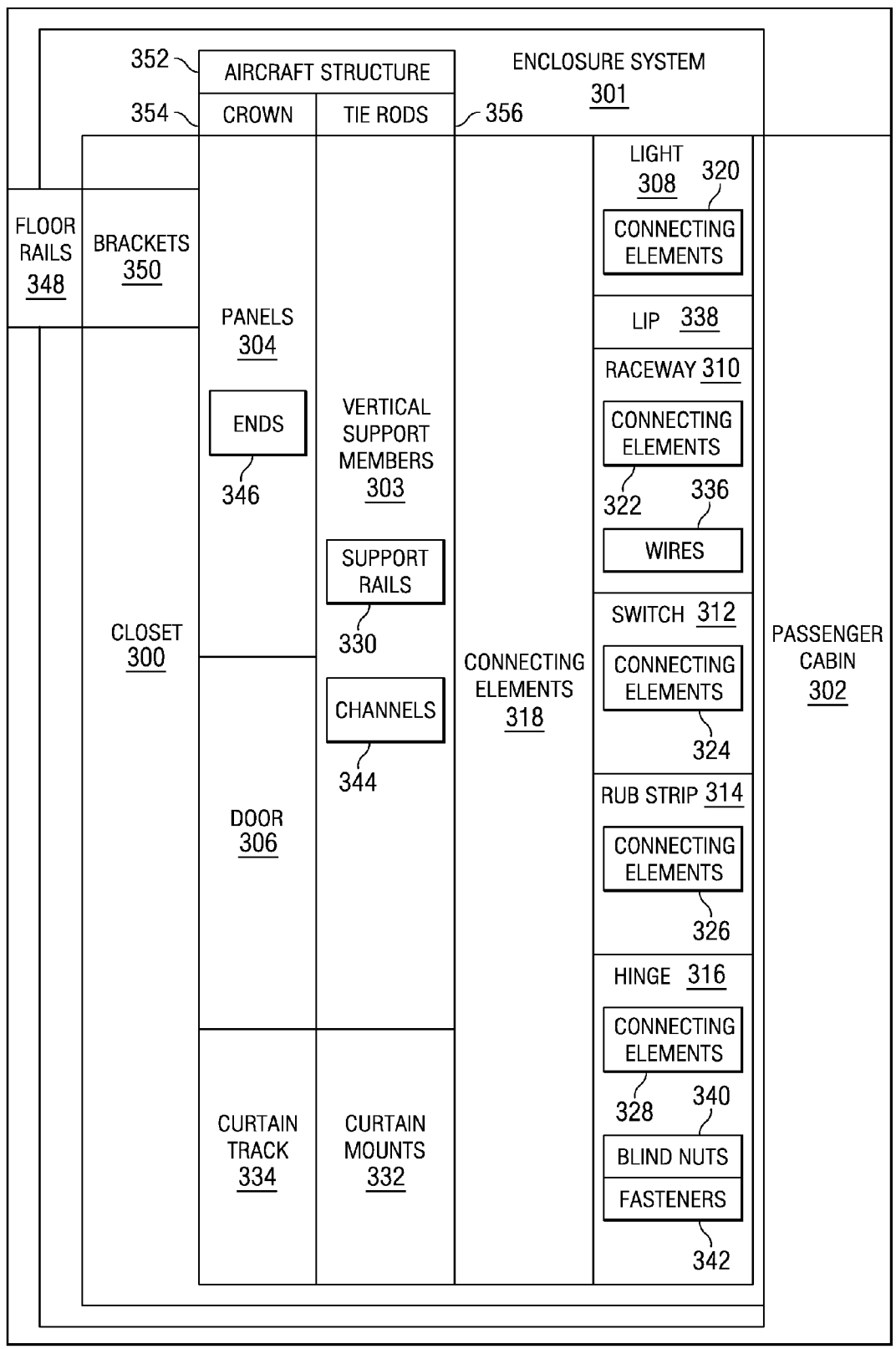
FIG. 3 is a diagram of a closet system in an aircraft in accordance with an advantageous embodiment.

With reference now to FIG. 3, a diagram of a closet system in an aircraft is depicted in accordance with an advantageous embodiment. In this example, closet 300 may be an example of a closet system located within passenger cabin 302. Passenger cabin 302 may be an aircraft cabin, in these examples. Passenger cabin 302 may be an example of interior 122 of aircraft 102 in FIG. 2. Closet 300 may be a specific example of one implementation of enclosure system 301 that may be used within passenger cabin 302.

As depicted, closet 300 includes vertical support members 303, panels 304, door 306, light 308, raceway 310, switch 312, rub strip 314, and hinge 316. In this illustrative example, light 308, raceway 310, switch 312, rub strip 314, and hinge 316 may be attached to a vertical support members within vertical support members 303. In these examples, vertical support members 303 may include connecting elements 318.

Also, as illustrated, light 308 may include connecting elements 320; raceway 310 may include connecting elements 322; switch 312 may include connecting elements 324; rub strip 314 may include connecting elements 326; and hinge 316 may include connecting elements 328. Connecting elements 320, 322, 324, 326, and 328 may be configured to engage connecting elements 318. The engagement of the different connecting elements may secure or attach vertical support members 303 to light 308, raceway 310, switch 312, rub strip 314, and hinge 316.

These connecting elements may be, for example, without limitation, elements that may couple to each other without the use of fasteners. Fasteners may include, for example, without limitation, bolts, screws, tins, and other mechanical fasteners. In these examples, connecting elements 318 may be, for example, without limitation, a set of holes that may receive connecting elements, such as connecting elements 320, 322, 324, 326, and 328. These connecting elements may engage connecting elements 318 in a manner that causes the connecting elements to interlock or become secured to each other.

For example, connecting elements 320, 322, 324, 326, and 328 may take the form of tabs with a shape that may enter and engage the holes that form connecting elements 318. This connecting element may also be referred to as a snap fit element. Of course, other types of connecting elements may be used. Examples of other types of connecting elements may include, for example, without limitation, hook and loop fasteners, expanding plastic fasteners, tension clips, dovetail fastening systems, and other suitable interlocking components and/or joints.

In this manner, these various parts for closet 300 may be more easily attached to vertical support members 303. In these examples, these vertical support members may also be referred to as support rails 330. Support rails 330 may be formed from various materials. For example, without limitation, support rails 330 may be formed using extruded aluminum, composite materials, titanium, or some other suitable material.

In these examples, vertical support members 303 also may include curtain mounts 332. Curtain mounts 332 may be formed within vertical support members 303 to allow attachment of curtain track 334 to be mounted to closet 300.

In these examples, light 308 may be a molded plastic part with a shape that may allows light 308 to be connected to vertical support members 303 without fasteners. Light 308 may take various forms, for example, without limitation, light 308 may be an incandescent light, a light-emitting diode light, an aluminum light, a fluorescent light, and/or some other suitable light.

Raceway 310 may be a plastic extrusion with a shape that may allow raceway 310 to be connected to vertical support members 303 without fasteners. Further, raceway 310 may hide wires 336, which may lead to light 308. Raceway 310 may also be referred to as a cover.

Light 308 may also include lip 338. Lip 338 may be a flexible feature that hides any seam that may be present between light 308 and raceway 310 when light 308 and raceway 310 are placed adjacent to each other.

Rub strip 314 may be a plastic extrusion designed to allow for rub strip 314 to connect to vertical support members 303 without fasteners. Rub strip 314 may be a decorative feature that provides a smooth surface shape to closet 300.

Hinge 316 may be formed from aluminum extrusion with a shape allowing for easy attachment to vertical support members 303. In some advantageous embodiments, rather than using connecting elements 328, hinge 316 may be attached to vertical support members 303 using blind nuts 340, and fasteners 342. In some advantageous embodiments, instead of using blind nuts 340, another type of fastening component may be used, such as, for example, without limitation, clip-on nuts, or any suitable fastenerless connecting system.

In some advantageous embodiments, hinge 316 may be formed as part of a vertical support member within vertical support members 303. In other advantageous embodiments, hinge 316 may be designed to slide into a channel within channels 344. In these examples, panels 304 may be attached to or connected to vertical support members 303 by placing ends 346 of panels 304 into channels 344.

For example, without limitation, connecting elements 318 may engage connecting elements 320, 322, 324, 326, and 328 in a manner that allows for light 308, raceway 310, switch 312, rub strip 314, and hinge 316 to "snap" into place. In other words, once engaged, these connecting elements may not be easily removed without force and/or a suitable tool.

In these examples, closet 300 may be attached to floor rails 348 in passenger cabin 302 through brackets 350 attached to panels 304. Additionally, closet 300 may be attached to aircraft structure 352 in crown 354 of passenger cabin 302 through tie rods 356, or any other suitable means of attaching vertical support members 303 to aircraft structure 352.

Connecting elements 318, 320, 322, 324, 326, and 328 allow for different parts of closet 300 to be assembled to each other using less time, as compared to securing parts with mechanical fasteners, such as, for example, without limitation, bolts, screws, and other mechanical fastener requiring tools.

Attachment of these different components may not require the use of tools, in these examples. In this manner, the different advantageous embodiments may reduce the time and effort needed to install closet 300. Further, by integrating various components such as light 308, raceway 310, switch 312, rub strip 314, and hinge 316 into one or more vertical support members in vertical support members 303, better use of space within closet 300 may occur.

The illustration of closet 300 in FIG. 3 is not meant to imply or provide architectural and/or physical limitations to the manner in which a closet system may be constructed or designed in the different advantageous embodiments. As one non-limiting example, closet 300 may include other parts that may be attached to vertical support members 303, which are not illustrated.

For example, without limitation, support for shelves, hooks, and other suitable parts may also include snap fit features for engagement with connecting elements 318 in vertical support members 303. As another example, closet 300 may include additional doors other than door 306. Additionally, the different parts may be all attached to a single member in vertical support members 303 or distributed among additional vertical support members within vertical support members 303.

As yet another example, additional rub strips in addition to rub strip 314 may be included in closet 300. A rub strip may be present for each vertical support member within vertical support members 303 that may be seen by passengers, crew members, and other persons within passenger cabin 302. In some implementations, closet 300 may not require the use of tie rods 356 when closet 300 is implemented as a under bin closet.

Further, closet 300 also may be implemented to provide enclosures in other monuments that have a storage space. For example, closet 300 may be implemented for use in a lavatory, a galley, a bar unit, a video control station, a crew rest entrance enclosure, an attendant rest entrance enclosure, an attendant rest stowage unit, a crew rest stowage unit, or any other suitable enclosed compartment that may have corners. In other words, the different components and/or elements depicted in this example may be applied to any enclosure system having a corner.

Figure 4:
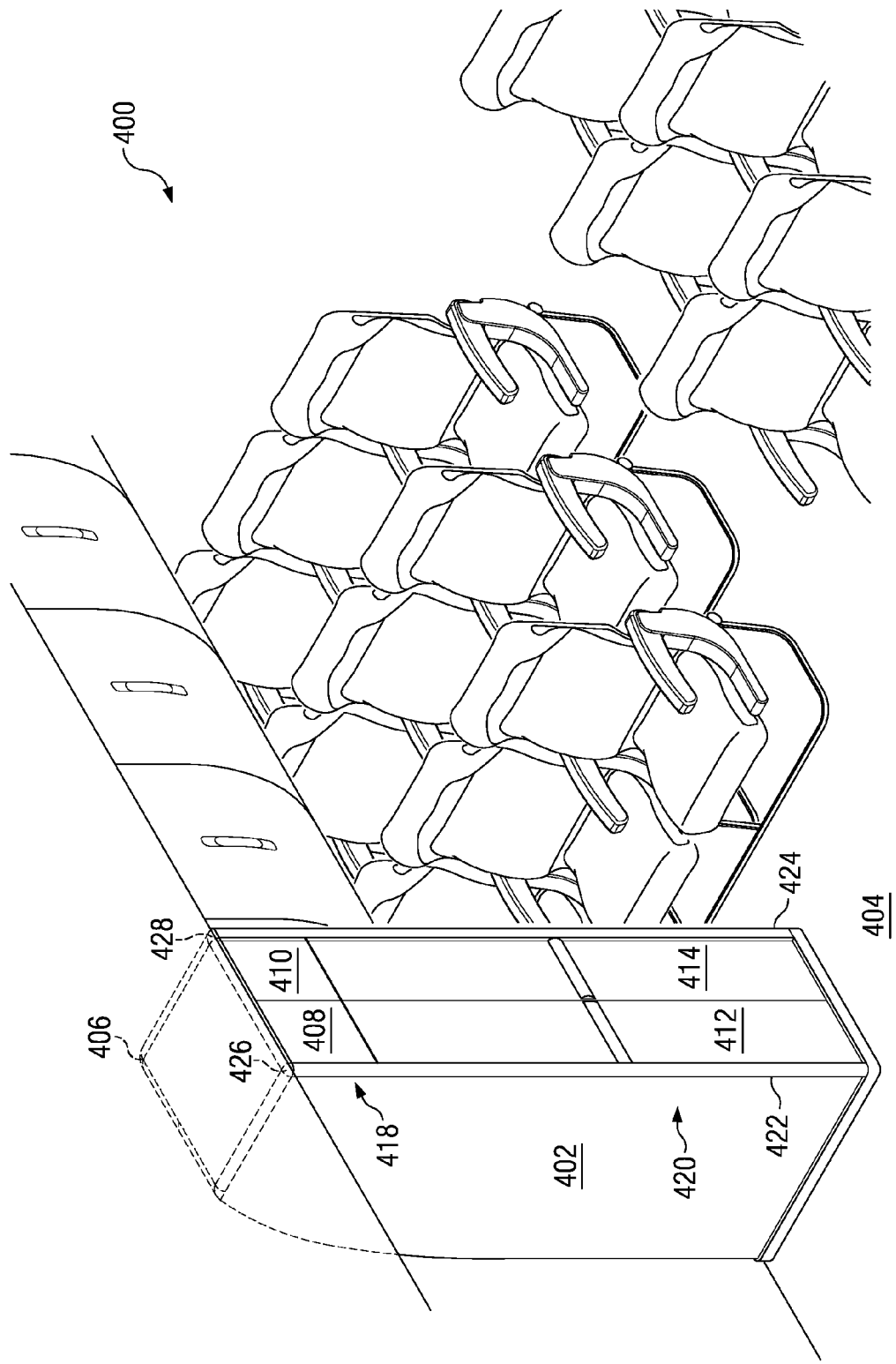
FIG. 4 is a diagram of a passenger cabin with a closet in accordance with an advantageous embodiment.

With reference now to FIG. 4, a diagram of a passenger cabin with a closet is depicted in accordance with an advantageous embodiment. In this example, passenger cabin 400 may be an example of a passenger cabin, such as passenger cabin 302 in FIG. 3.

In this depicted example, closet 402 may be an example of one implementation of closet 300 in FIG. 3 and may be a full height closet, extending from passenger floor 404 to crown 406 within passenger cabin 400. Closet 402 may be constructed in a manner similar to closet 300 in FIG. 3.

As illustrated, closet 402 includes doors 408, 410, 412, and 414. While four doors are shown, other suitable numbers of doors and door arrangements are within the contemplation of those will skill in the art. Closet 402 may have upper section 418 and lower section 420. Doors 408 and 410 may provide access to upper section 418, while doors 412 and 414 may provide access to lower section 420.

In this particular example, rub strip 422 and rub strip 424 are shown on the exterior of closet 402. Rub strip 422 and rub strip 424 may be attached to and hide support rails 426 and 428 from view within passenger cabin 400. Rub strips 422 and 424 may have various shapes depending on the desired aesthetics. For example, rub strips 422 and 424 may, for example, without limitation, have a curved shape, a cornered shape, or some other suitable shape.

Figure 5:
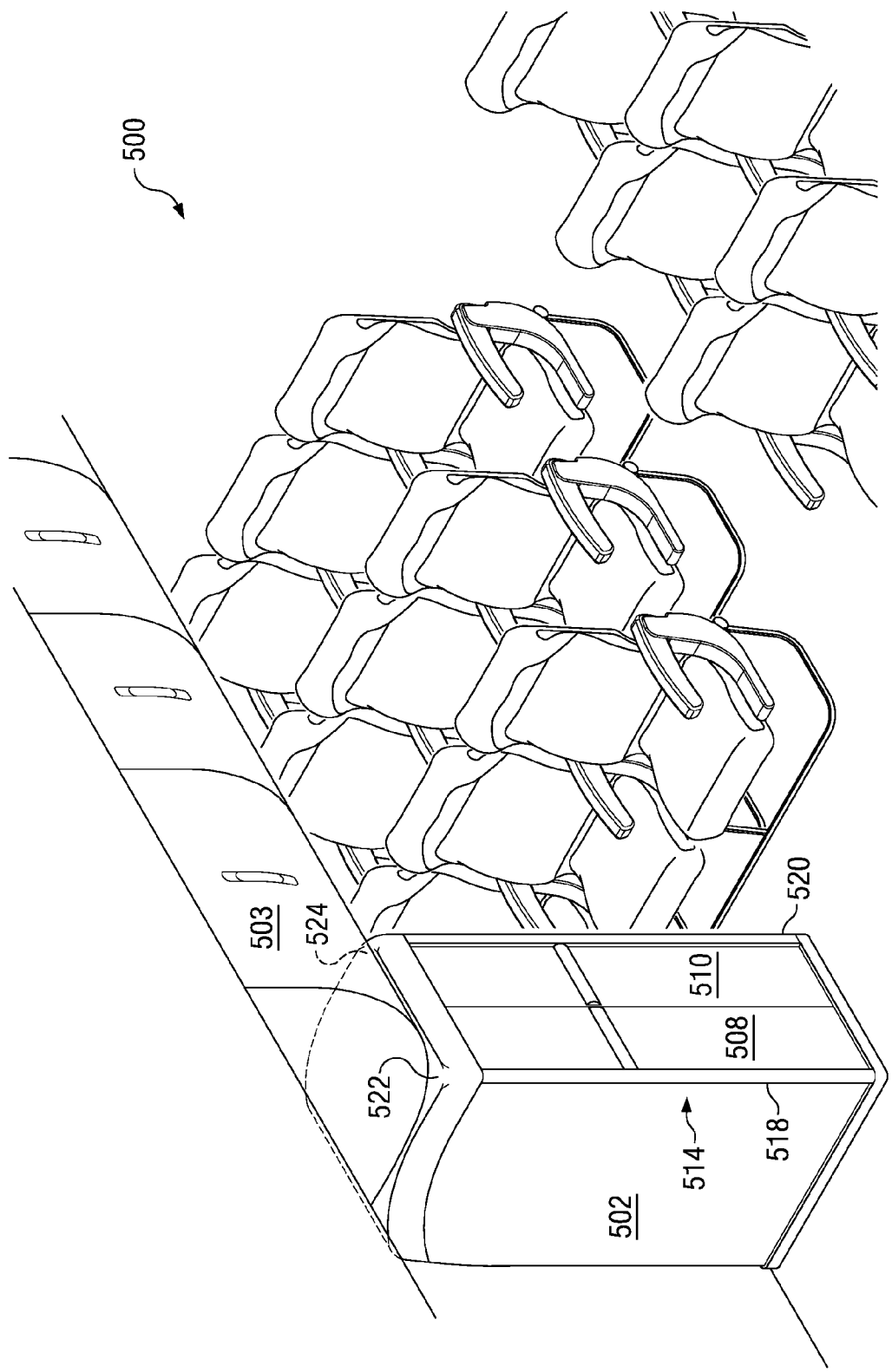
FIG. 5 is a diagram illustrating a closet in a passenger cabin in accordance with an advantageous embodiment.

With reference now to FIG. 5, a diagram illustrating a closet in a passenger cabin is depicted in accordance with an advantageous embodiment. In this example, passenger cabin 500 is shown with closet 502, which extends to overhead bin 503. Closet 502 provides another example of an implementation of closet 300 in FIG. 3.

In a similar fashion to closet 402 in FIG. 4, closet 502 includes doors 508 and 510. Closet 502 may have section 514 in which doors 508 and 510 provide access to section 514. As illustrated, rub strips 518 and 520 may be attached to and/or hide support rails 522 and 524 from view in closet 502. While two doors are shown, other suitable numbers of doors and door arrangements are within the contemplation of those will skill in the art.

Figure 6:
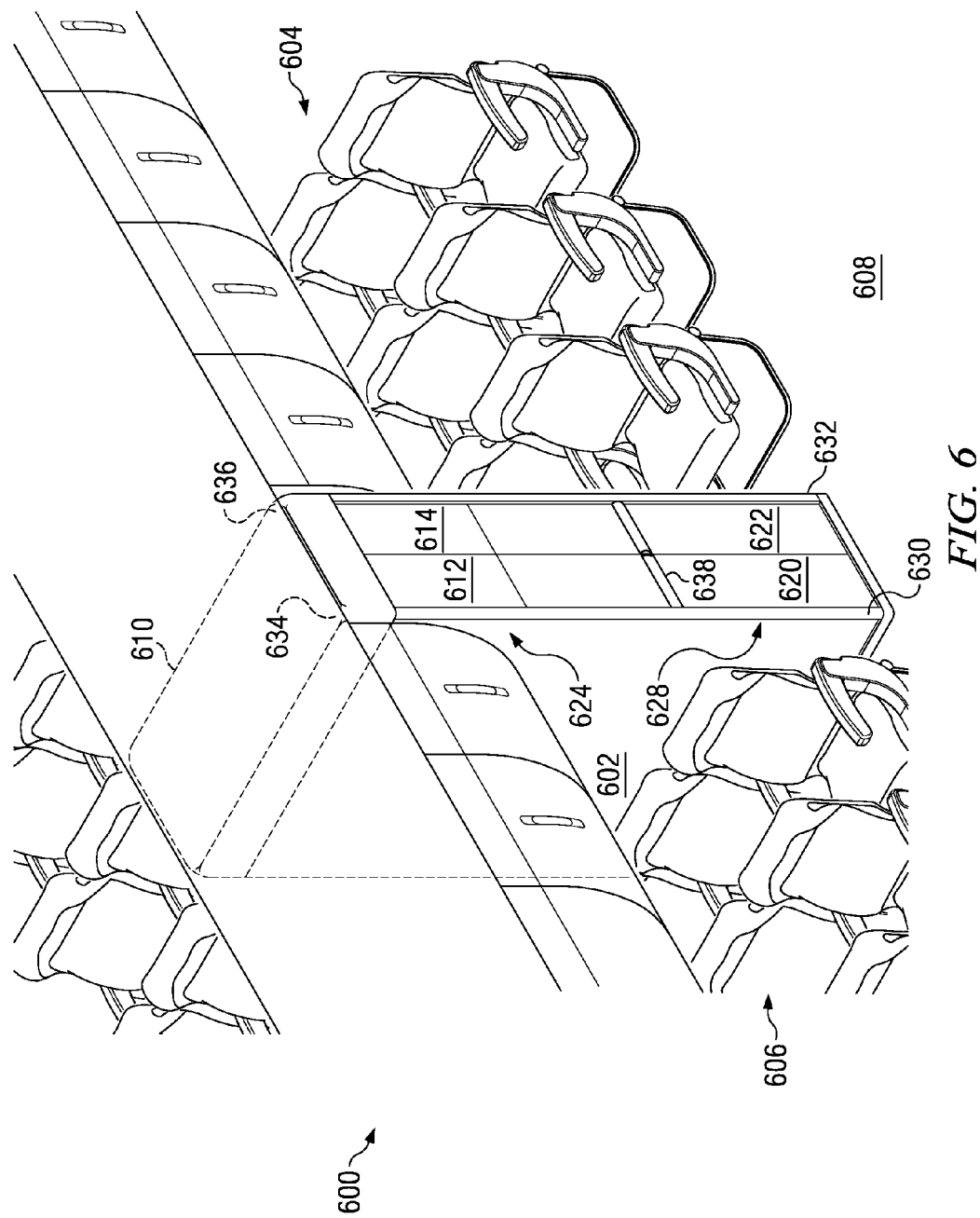
FIG. 6 is a diagram of a closet in a passenger cabin in accordance with an advantageous embodiment.

With reference now to FIG. 6, a diagram of a closet in a passenger cabin is depicted in accordance with an advantageous embodiment. In this example, passenger cabin 600 may include closet 602 as a divider to separate seating section 604 from seating section 606 in passenger cabin 600.

Closet 602 may be an example of yet another embodiment of closet 300 in FIG. 3. Closet 602 may extend from floor 608 to crown 610. In this example, closet 602 includes doors 612, 614, 620, and 622. In this example, closet 602 includes upper section 624, and lower section 628.

Doors 612 and 614 provide access to upper section 624, and doors 620 and 622 provide access to lower section 628. In this illustrative example, closet 602 also may include rub strips 630 and 632, which may cover and hide support rails 634 and 636 from view within passenger cabin 600. Rub strip 638 may take the form of a horizontal rub strip. Rub strip 634, 636, and 638 may have various shapes similar to rub strips 422, 424, 518, and 520.

Figure 7:
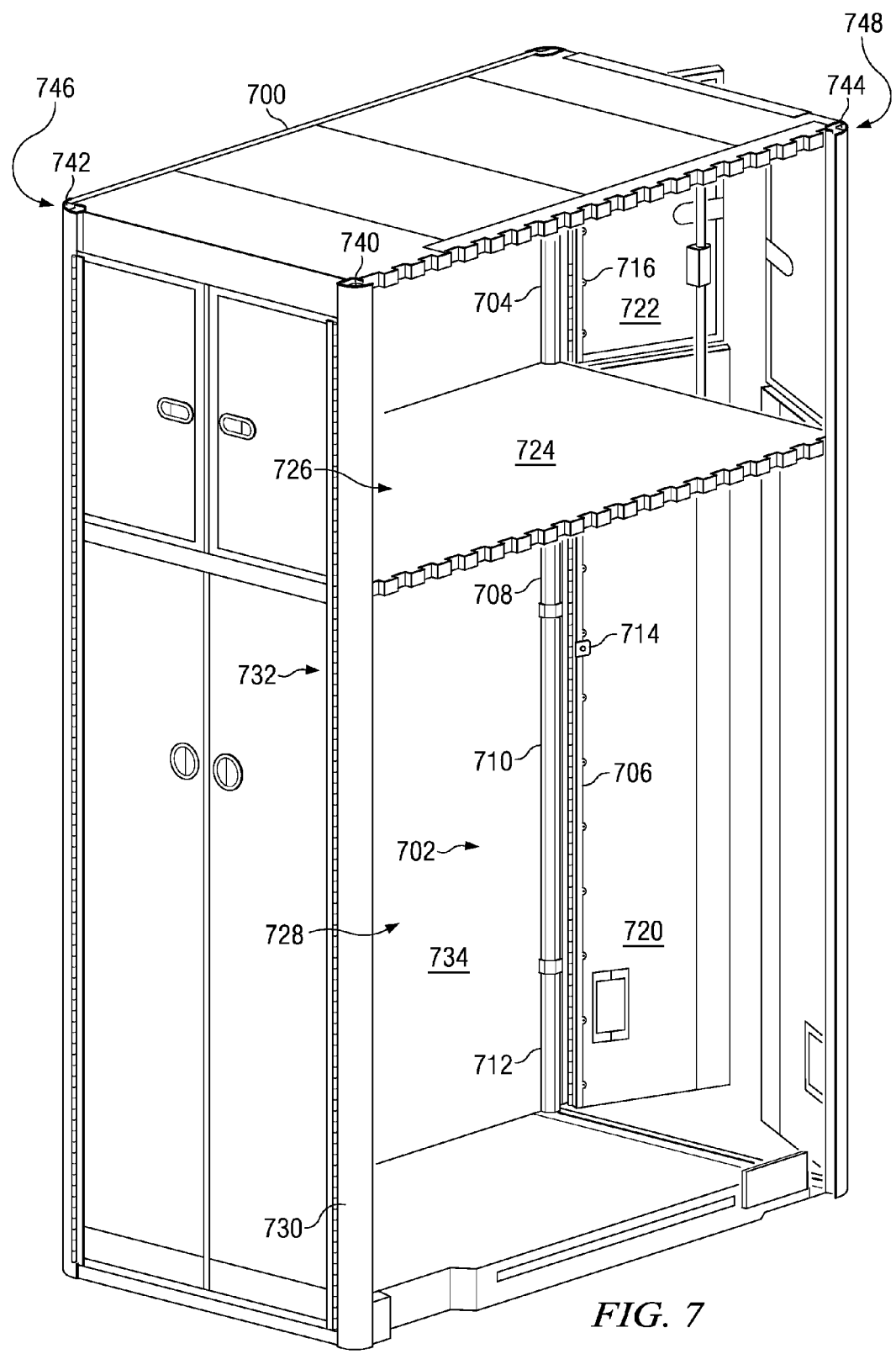
FIG. 7 is a diagram of a closet in accordance with an advantageous embodiment.

With reference now to FIG. 7, a diagram of a closet is depicted in accordance with an advantageous embodiment. In this example, a cutaway view of closet 700 is presented to illustrate different features that may be integrated into corner 702 of closet 700.

In this example, corner 702 of closet 700 may include a number of features within closet 700. As illustrated, support rail 704 may be present in corner 702. In this example, hinge unit 706, raceway 708, light 710, raceway 712, assembly 714, and hinge unit 716 are illustrated. Raceway 708, light 710, and raceway 712, hinge unit 706, assembly 714, and hinge unit 716 may be attached to support rail 704.

Door 720 may be attached to hinge unit 706, while door 722 may be attached to hinge unit 716. When door 720 closes, assembly 714 may be activated to turn off light 710. When door 720 opens, assembly 714 may be actuated to turn on light 710. In this example, shelf 724 divides closet 700 into upper section 726 and lower section 728. In this particular illustrated example, rub strip 730 is shown in corner 732 of closet 700. Rub strip 730 may be attached to support rail 740, which may be hidden from view by rub strip 730. This support rail may be similar to support rail 704 in corner 702.

In a similar fashion, support rails 742 and 744 may be used in corners 746 and 748. These support rails may also include similar features as illustrated for support rail 704, depending on the particular implementation. In this manner, different elements may be integrated into support rails, such as support rails 704, 740, 742, and 744 to provide more space within closet 702.

In these examples, raceway 708, light 710, and raceway 712, may be attached to support rail 704 using connecting elements, such as, for example, without limitation, snap fit features. With snap fit features, installation time may be reduced as compared to using mechanical fasteners, such as screws, bolts, and other mechanical fasteners. Hinge unit 724 and hinge unit 716 may be attached to support rail 704 in a similar fashion.

In other advantageous embodiments, mechanical fasteners may be employed to fasten hinge unit 706 and hinge unit 716 to support rail 704, depending on the particular implementation. Wall panel 734 also may be attached to support rails 704 and 742.

Figure 8:
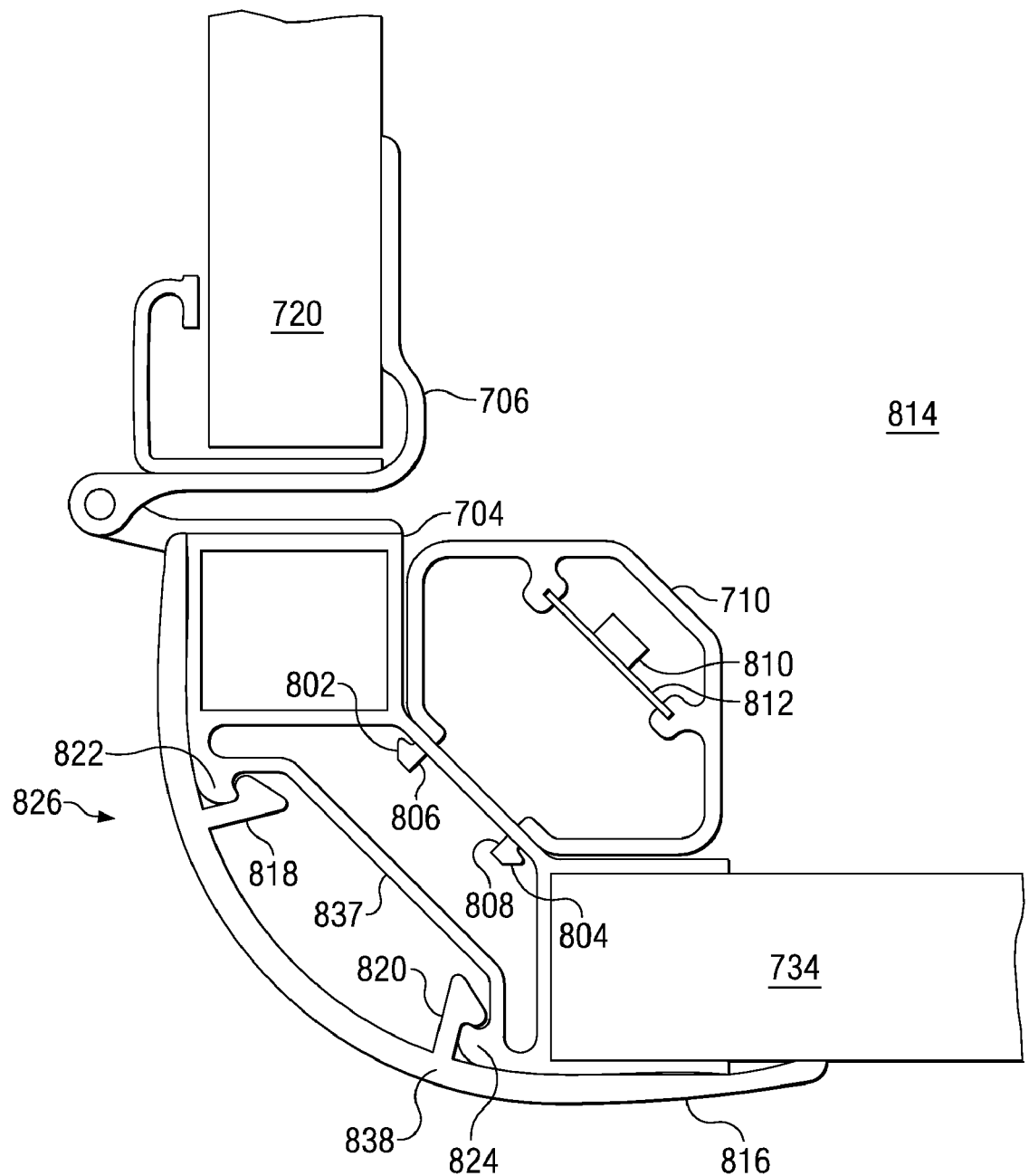
FIG. 8 is a diagram illustrating a cross-sectional view of a support rail in accordance with an advantageous embodiment.

With reference now to FIG. 8, a diagram illustrating a cross-sectional view of a support rail is depicted in accordance with an advantageous embodiment. In this example, support rail 704 is illustrated in a cross-sectional top view. In this example, light 710 may be attached to support rail 704 using connecting elements 802 and 804. Connecting elements 802 and 804 may be formed as an integral part of light 710.

In other advantageous embodiments, connecting elements 802 and 804 may be attached to light 710 using mechanisms, such as, for example, without limitation, adhesive, welding, mechanical fasteners, or other suitable components. In these examples, connecting elements 802 and 804 may be, for example, without limitation, snap fit features in the form of tabs that may pass through connecting elements 806 and 808 within support rail 704 to attach light 710 to support rails 704. In these examples, connecting elements 806 and 808, may be, for example, snap fit elements that take the form of holes. In these examples, a hole may take various forms, such as, a circle, a slot, an oval, or some other suitable shape.

As illustrated, light 710 may include light emitting diode 810 mounted on board 812 to provide illumination in interior 814 of closet 700. In other embodiments, light 710 may use other illumination mechanisms as described above.

In this illustrative example, rub strip 816 may be attached to support rail 704 using connecting elements 818 and 820. In these examples, connecting elements 818 and 820 engage connecting elements 822 and 824 formed in support rail 704. Further, section 826 of support rail 704 may provide curtain mounting provisions to mount a curtain across a portion of a passenger cabin from support rail 704.

Additionally, section 837 also may provide a section capable of receiving a curtain rail. Although shown in cross section, the different parts, such as light 710 and rub strip 816, may include additional snap fit features along the length of these parts.

Figure 9:
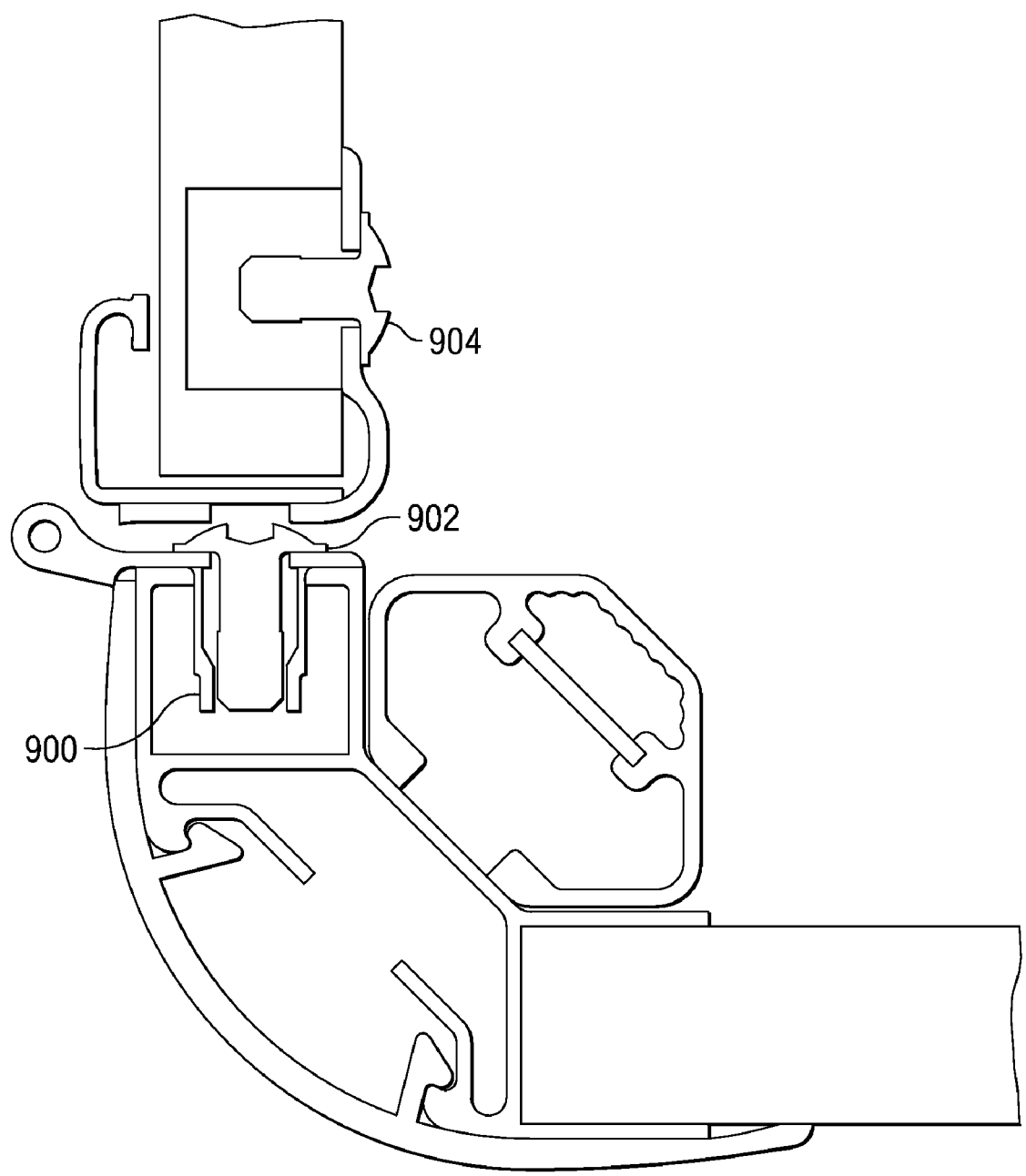
FIG. 9 is a diagram of cross sectional view of a support rail and a hinge unit in accordance with an advantageous embodiment.

Turning now to FIG. 9, a diagram of cross sectional view of a support rail and a hinge unit is depicted in accordance with an advantageous embodiment. In this example, support rail 700 is illustrated in a cross sectional top view in which more details of hinge unit 706 may be seen. In this illustrative example, hinge unit 706 may be attached to support rail 704 using blind nut 900 and fastener 902. Door 720 may be attached to hinge unit 704 using fastener 904.

Figure 10:
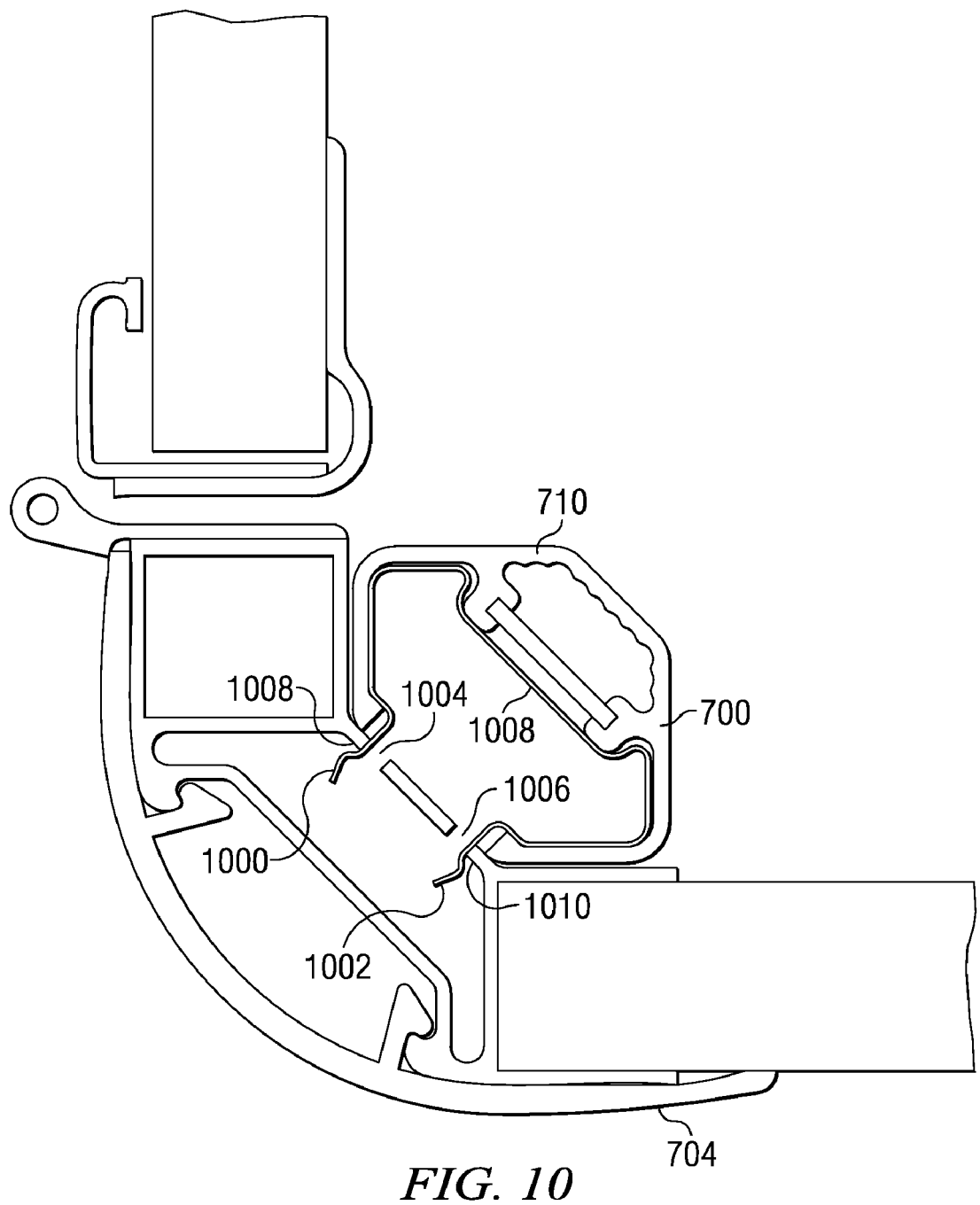
FIG. 10 is a diagram of a cross sectional view of a support rail and a light in accordance with an advantageous embodiment.

With reference now to FIG. 10, a diagram of a cross sectional view of a support rail and a light is depicted in accordance with an advantageous embodiment. In this example, support rail 704 is illustrated in a cross sectional with light 710. Connecting elements 1000 and 1002 for light 710 may be seen in this view. Support rail 704 may have connecting elements 1004 and 1006, which may take the form of holes in these examples. Connecting elements 1000 and 1002 in this particular example may take the form of flexible tabs. As illustrated connecting elements 1000 and 1002 may be formed from metal strip 1008.

Connecting elements 1000 and 1002 in light 710 may engage connecting elements 1004 and 1006 in support rail 704. This engagement may occur by "snapping" connecting elements 1000 and 1002 into place with connecting elements 1004 and 1006 in support rail 704. In these examples, connecting elements 1000 and 1002 may securely engage section 1008 and section 1010 of connecting elements 1004 and 1006 to attach light 710 to support rail 704 without the needs to mechanical fasteners.

Figure 11:
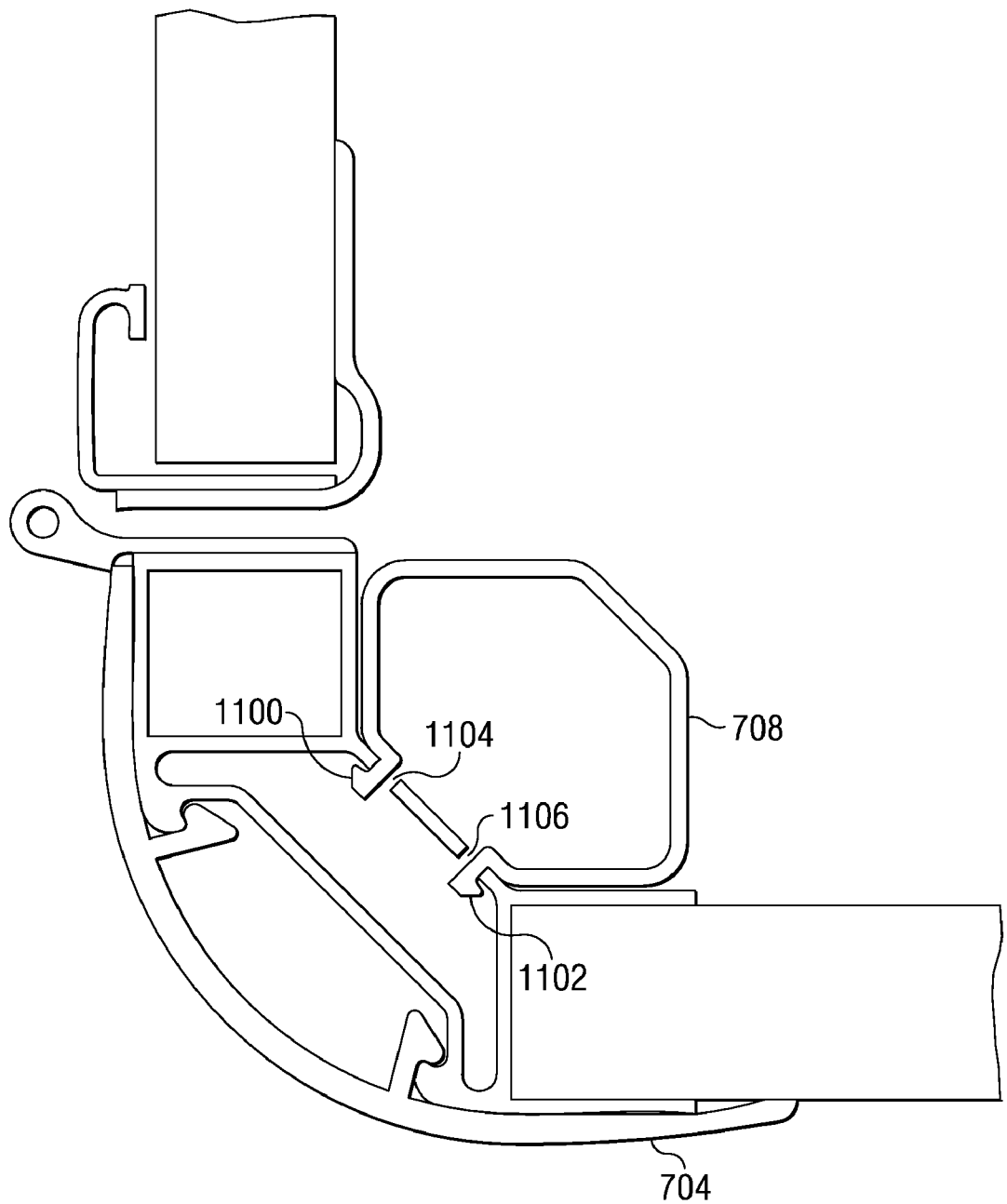
FIG. 11 is a diagram illustrating a cross sectional view of a raceway and a support rail in accordance with an advantageous embodiment.

With reference now to FIG. 11, a diagram illustrating a cross sectional view of a raceway and a support rail is depicted in accordance with an advantageous embodiment. In this example, raceway 708 is shown in cross section with respect to support rail 704. Raceway 708 may include connecting elements 1100 and 1102. In these examples, connecting elements 1100 and 1102 may take the form of flexible tabs and may be integral with raceway 712.

These connecting elements may engage connecting elements 1104 and 1106 in support rail 704. In these examples, connecting elements 1104 and 1106 may take the form of holes through which connecting elements 1100 and 1102 may pass and become engaged. In this manner, raceway 708 may be secured to support rail 704 without using mechanical fasteners.

Figure 12:
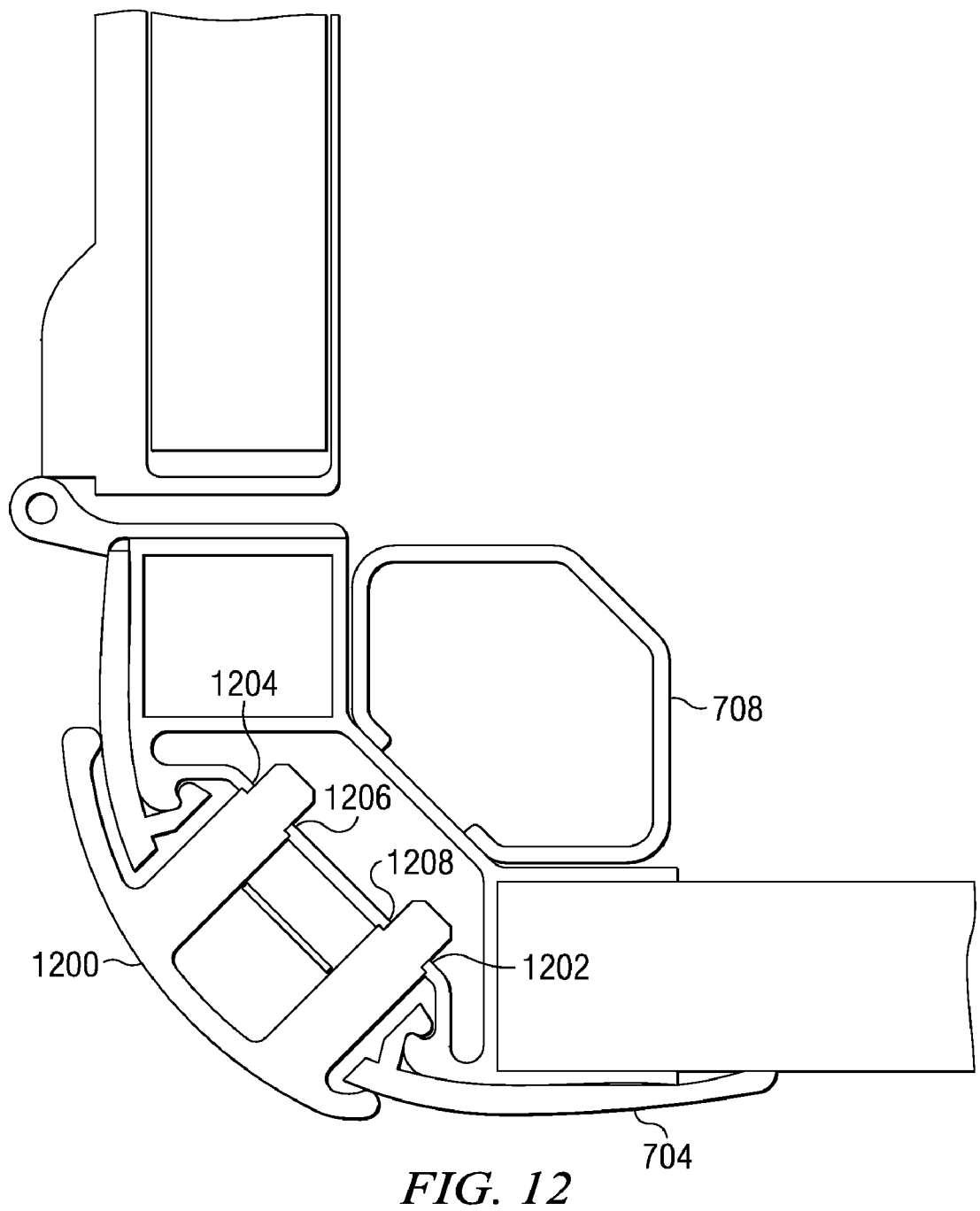
FIG. 12 is a cross sectional view of a support rail and a curtain track attachment fitting in accordance with an advantageous embodiment.

With reference now to FIG. 12, a cross sectional view of a support rail and a curtain track attachment fitting is depicted in accordance with an advantageous embodiment. In this example, raceway 704 is shown with curtain track attachment fitting 1200. As illustrated, curtain track attachment fitting 1200 may include connecting elements 1202 and 1204. These connecting elements may engage with connecting elements 1206 and 1208 to secure curtain track attachment fitting 1200 to support rail 704 without a need for mechanical fasteners.

Figure 13:
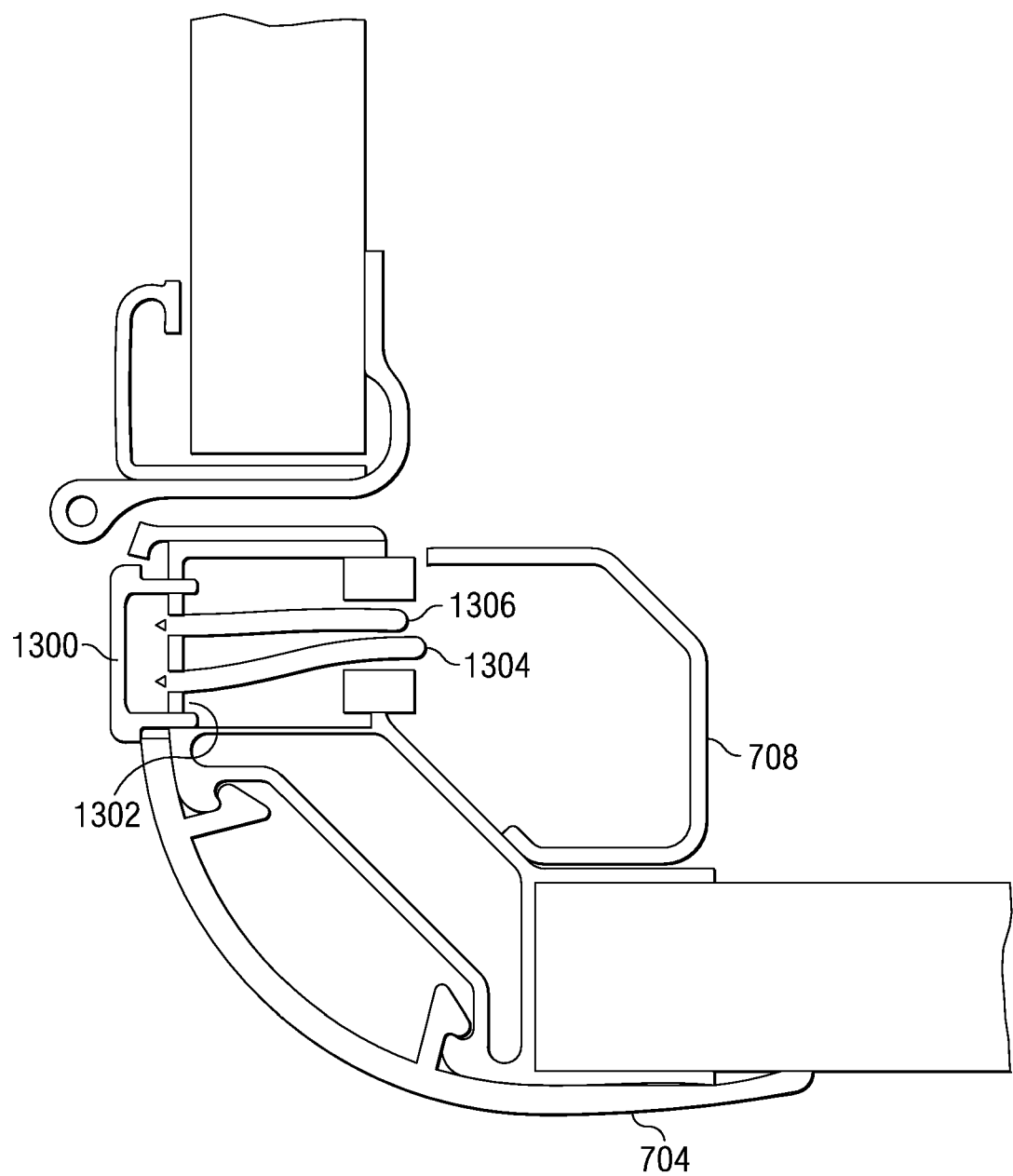
FIG. 13 is a diagram illustrating a cross sectional view of an emergency light and a support rail in accordance with an advantageous embodiment.

With reference now to FIG. 13, a diagram illustrating a cross sectional view of an emergency light and a support rail is depicted in accordance with an advantageous embodiment. In this example, emergency light 1300 may be attached to support rail 704 by placing emergency light 1300 into opening 1302 in support rail 704. In these examples, wires 1304 and 1306 may supply power to emergency light 1300 and may be run through raceway 708.

Figure 14:
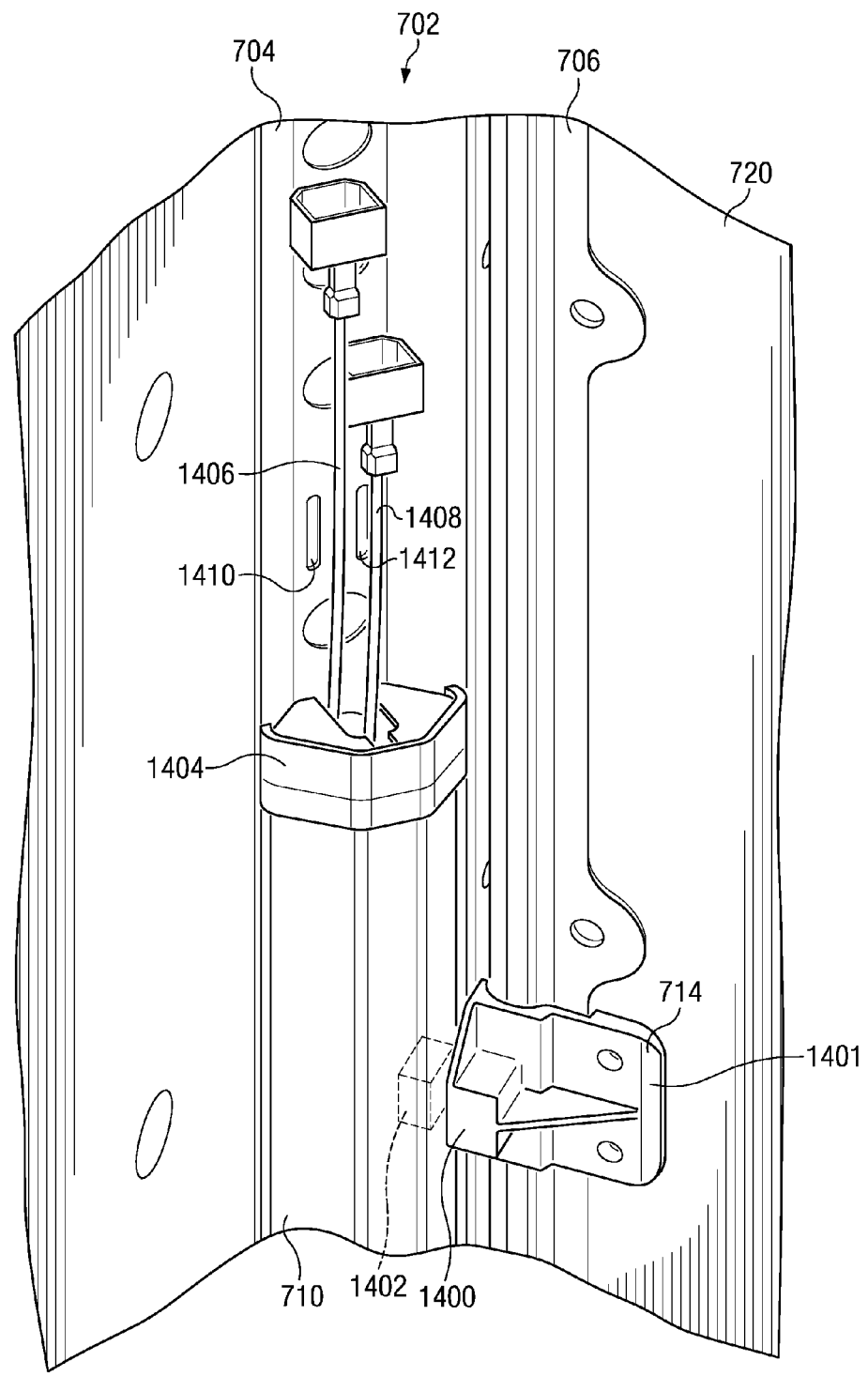
FIG. 14 is a diagram of a more detailed view of a portion of a corner of a closet in accordance with an advantageous embodiment.

With reference now to FIG. 14, a diagram of a more detailed view of a portion of a corner of a closet is depicted in accordance with an advantageous embodiment. In this example, corner 702 is shown in more detail. In this example, assembly 714 may be attached to hinge unit 706 and/or door 720. Assembly 714 may include magnet 1400 enclosed in housing 1401. Housing 1401 may be a plastic housing in these examples. Magnet 1400 may cause switch 1402 in light 710 to be actuated to turn on light 710 when door 720 opens.

In a similar fashion, when door 720 closes, magnet 1400 within assembly 714 may cause switch 1402 to actuate and turn off light 710.

As can be seen, in this more detailed view, light 710 also may include lip 1404. Lip 1404 may be a flexible material, such as, for example, without limitation, rubber, silicon, or some other suitable material. Lip 1404 may provide a cover for receiving a raceway to hide seams. In this view, raceway 708 may be removed to illustrate wires 1406 and 1408, which may connect to light 710 to provide power for light 710.

Further, in this view, support rail 704 may be seen with connecting elements 1410 and 1412. These connecting elements may take the form of holes that may receive and retain a connecting element from another component, such as raceway 708 shown in FIG. 7, and removed from view in this figure for purposes of illustrating other features of the advantageous embodiments.

Figure 15:
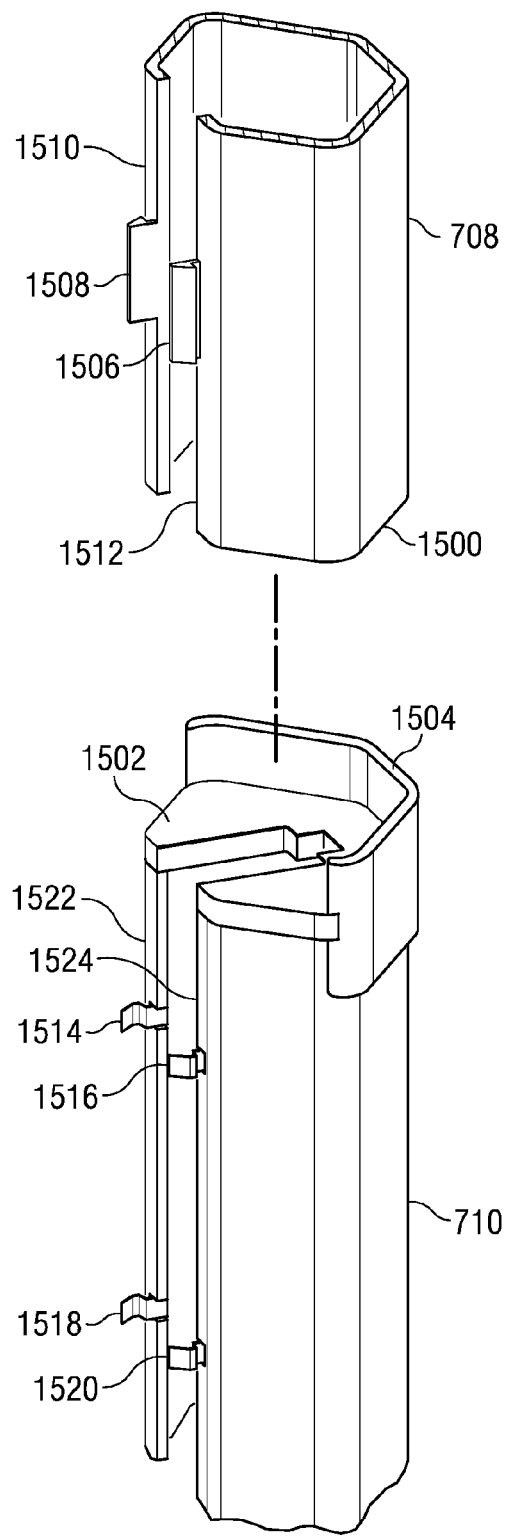
FIG. 15 is a diagram illustrating a raceway and a light in accordance with an advantageous embodiment.

With reference now to FIG. 15, a diagram illustrating a raceway and a light is depicted in accordance with an advantageous embodiment. As can be seen, in this example, end 1500 of raceway 708 may be placed onto surface 1502 of light 710. As can be seen, lip 1504 protrudes or extends above surface 1502 to cover a seam that may be formed between end 1500 and surface 1502.

Additionally, in this view of raceway 708 and light 710, connecting elements 1506 and 1508 are illustrated on edges 1510 and 1512 of raceway 708. The connecting elements may engage connecting elements, such as, for example, without limitation, connecting elements 1402 and 1412 in FIG. 14.

In a similar fashion, light 710 also may include connecting elements 1514, 1516, 1518, and 1520 on edges 1522 and 1524 of light 710. These connecting elements also may engage similar connecting elements in support rail 704 in FIG. 7. In these examples, connecting elements 1506, 1508, 1514, 1516, 1518, and 1520 may take the form of tabs that may engage holes within support rail 704. Engagement of these connecting elements may secure raceway 708 and light 710 to support rail 704.

Figure 16:
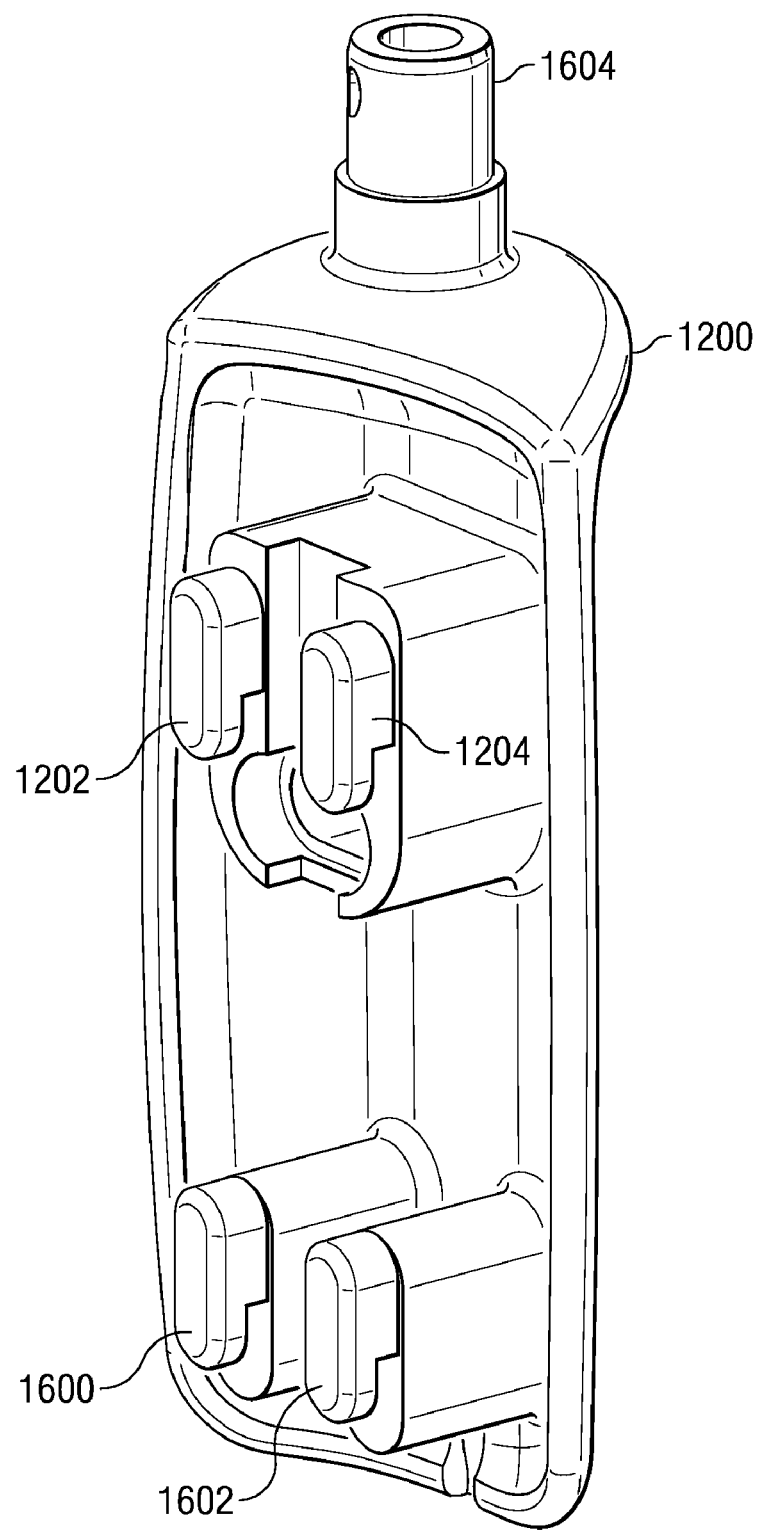
FIG. 16 is a diagram illustrating a curtain track attachment fitting in accordance with an advantageous embodiment.

With reference now to FIG. 16, a diagram illustrating a curtain track attachment fitting is depicted in accordance with an advantageous embodiment. In this example, curtain track attachment fitting 1200 is shown in a perspective view. Curtain track attachment fitting 1200 may also include connecting elements 1600 and 1602 in addition to connecting elements 1202 and 1204, for engagement with connecting elements in support rail 704. Member 1604 may allow for attachment of a curtain track to the closet.

Figure 17:
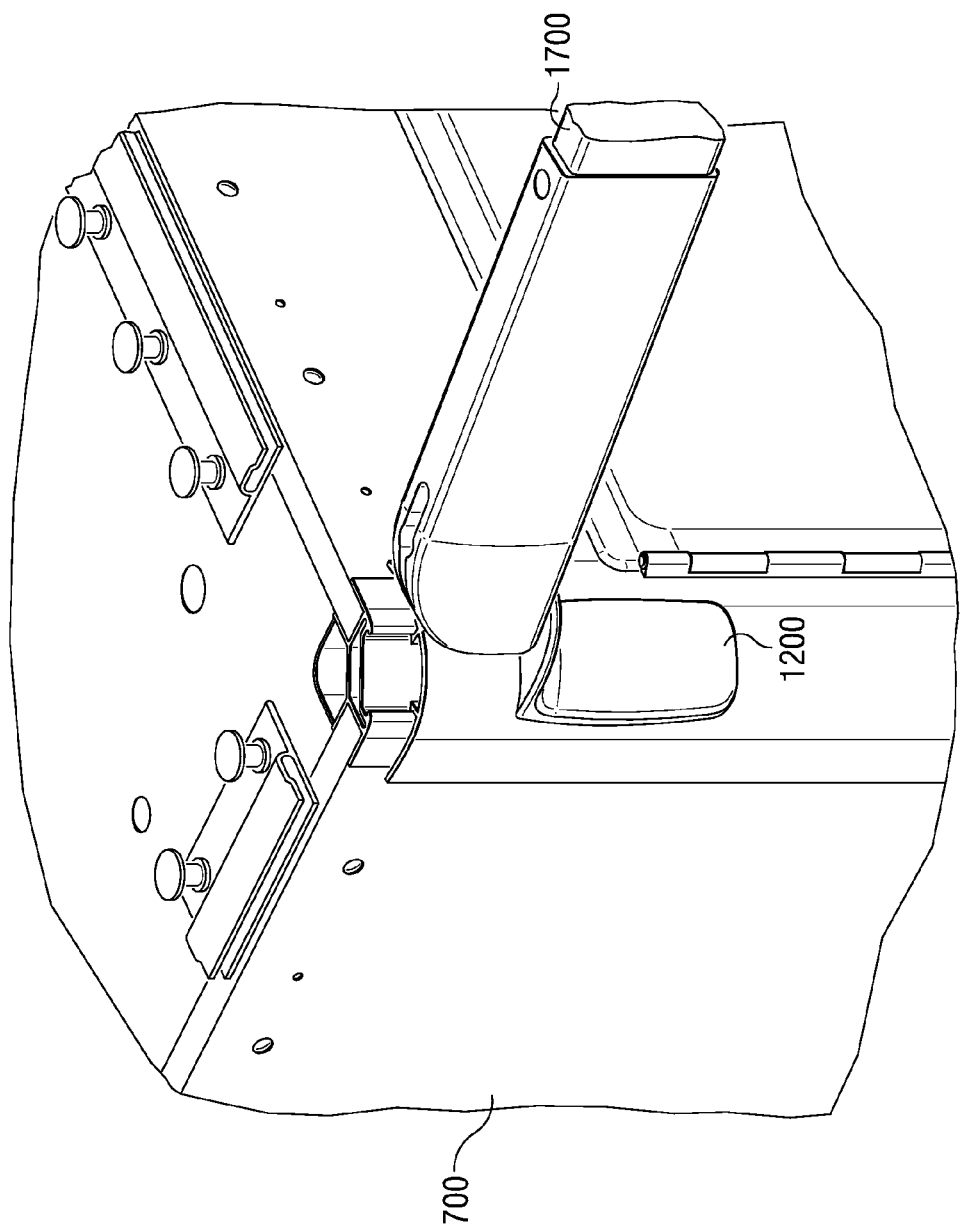
FIG. 17 is a diagram illustrating attachment of a curtain track to curtain track attachment fitting in accordance with an advantageous embodiment.

With reference now to FIG. 17, a diagram illustrating attachment of a curtain track to curtain track attachment fitting is depicted in accordance with an advantageous embodiment. In this example, curtain track 1700 may be attached to curtain track attachment fitting 1200 on closet 700 by any suitable means.

Figure 18:
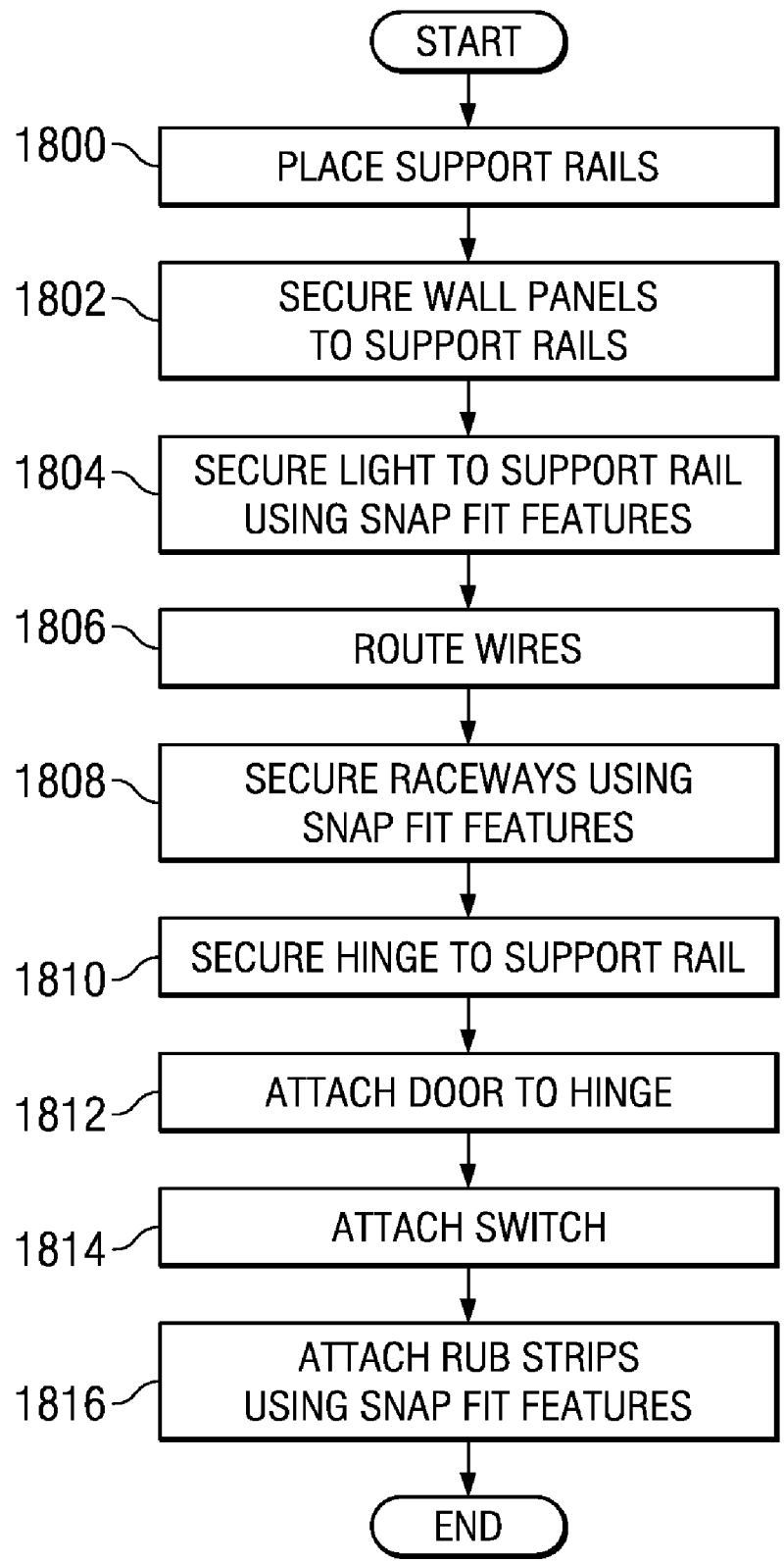
FIG. 18 is a flowchart of a process for assembling a closet in accordance with an advantageous embodiment.

With reference now to FIG. 18, a flowchart of a process for assembling a closet is depicted in accordance with an advantageous embodiment. The process illustrated in FIG. 18 may be used to assemble a closet, such as closet 300 in FIG. 3.

The process begins by placing support rails (operation 1800). One or more support rails may be used to provide a frame or structural support for the closet. If the closet is located in a corner, only a single support rail may be needed. In other advantageous embodiments, a closet that is in a stand alone position may require four support rails.

A closet located with one end against a wall may require two support rails. Wall panels may be secured to the support rails (operation 1802). A light may be secured to a support rail using snap fit features (operation 1804). The selected support rail, in this example, may be the support rail on which the door may be attached. Of course, in other advantageous embodiments, the light may be positioned on a different support rail.

The process then routes wires to the light (operation 1806). Next, raceways may be secured to the support rail using snap fit features (operation 1808). The raceways may be secured to the support rail in a manner to hide the support rail and wires. A hinge may then be secured to the support rail (operation 1810). Depending on the particular implementation, snap fit features may be used. In other advantageous embodiments, the hinge may be attached using traditional mechanical fasteners.

A door may be attached the hinge (operation 1812) and a switch may be attached to the door and/or hinge (operation 1814). Rub strips may be attached to the exterior or the support rails using snap fit features (operation 1816), with the process termination thereafter.

The different operations illustrated in FIG. 18 are presented in one order in which the different operations may be performed. Of course, in other advantageous embodiments, different operation may be performed before others and other operations may be performed in addition to or in place of the ones illustrated.

For example, additional operations may include securing the support rails to the structure of the aircraft and/or securing wall panels to floor rails. In other advantageous embodiments, a light may not be needed for the closet. As yet another non-limiting example, additional doors or hinges may be attached to the same support rail to provide different sections with different access within the closet.

The description of the different advantageous embodiments has been presented for purposes of illustration and description, and is not intended to be exhaustive or limited to the embodiments in the form disclosed. Many modifications and variations will be apparent to those of ordinary skill in the art. For example, the different illustrative examples of closets have been described with respect to use in aircraft in these examples.

In other advantageous embodiments, these closets and/or enclosures may be placed or implemented in other locations. For example, closets implemented according to the different advantageous embodiments may be located in buildings, ships, trains, boats, submarines, and other suitable locations. Further, the different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An enclosure system for a structure comprising:
a support rail of the enclosure system having a plurality of connecting elements, the support rail having a top end connected to a crown of the structure by a tie rod and a bottom end connected to a floor rail by a bracket;
a light running a length of the support rail engaged to an interior of the support rail by a first set of connecting elements of the plurality of connecting elements;
a rub strip engaged to an exterior of the support rail by a second set of connecting elements of the plurality of connecting elements; and
a hinge unit connected to the support rail.

2. The enclosure system of claim 1 further comprising:
a wall panel connected to the support rail.

3. The enclosure system of claim 1 further comprising:
a door attached to the hinge unit.

4. The enclosure system of claim 1, wherein support rail is a first support rail and further comprising:
a set of support rails; and
a set of wall panels connected to the first support rail and the set of support rails to form walls for the enclosure system.

5. The enclosure system of claim 1, wherein the rub strip covers the support rail.

6. The enclosure system of claim 1 further comprising:
a switch operable to turn on the light when the door attached to the hinge unit is opened and operable to turn off the light when the door is closed.

7. The enclosure system of claim 1, further comprising:
a set of wires within a cavity of the support rail and connected to the light a cavity and covered by the raceway.

8. The enclosure system of claim 1, wherein the support rail has a curtain mounting section connected to a curtain rail.

9. The enclosure system of claim 1, wherein the plurality of connecting elements, the first set of connecting elements and the second set of connecting elements are a plurality of snap to fit elements.

10. The enclosure system of claim 1, wherein the first set of connecting elements and the second set of connecting elements are plurality of holes, each of the plurality of holes configured to receive one of a plurality of tabs.

11. The enclosure system of claim 1, wherein the hinge unit is made from one of an aluminum extrusion, steel, and a composite material.

12. The enclosure system of claim 1, wherein the light is selected from one of a light emitting diode light, an incandescent light, and a fluorescent light.

13. The enclosure system of claim 7, wherein the light has a lip on a first end extending above a surface of the first end, wherein the lip covers a seam formed between the raceway and the light when the raceway is adjacent to the first end.

14. The enclosure system of claim 1, wherein the crown is in an aircraft structure.

15. The enclosure system of claim 2, wherein the wall panel has a bottom side connected to the floor rail in an aircraft.

16. The enclosure system of claim 1, wherein the structure is one of an aircraft, a train, a bus, a boat, a submarine, and a building.

17. The enclosure system of claim 1, wherein the hinge unit is integrated as part of the support rail.

18. The enclosure system of claim 1, wherein the enclosure system extends to one of the crown and an overhead bin, wherein the crown is in a passenger cabin of an aircraft.

19. The enclosure system of claim 1, wherein the enclosure system is selected from one of a closet, a lavatory, a galley, a bar unit, a video control station, a crew rest entrance enclosure, an attendant rest entrance enclosure, an attendant rest stowage unit, and a crew rest stowage unit.

20. A method for installing a closet in an aircraft, the method comprising:
   providing the aircraft, a support rail, a light, a rub strip, and a hinge unit;
   mounting the support rail in a location for the closet in the aircraft, to support for the closet;
   engaging the light along a length of an interior of the support rail by a first set of connecting elements of a plurality of connecting elements of the support rail;
   engaging the rub strip to a second set of connecting elements of the plurality of connecting elements on an exterior of the support rail; and
   connecting the hinge unit to the support rail.

21. The method of claim 20 further comprising:
   providing a raceway;
   engaging the raceway to a third set of connecting elements of the plurality of connecting elements on an interior of the support rail.

22. The method of claim 20 further comprising:
   providing an aircraft structure within the aircraft, wherein the aircraft structure includes a passenger compartment having a crown, a tie rod, a floor rail in the aircraft structure, and a bracket;
   mounting the support rail to an aircraft support structure by connecting a tie rod to a crown of a passenger compartment and to a floor rail by a bracket.

23. An aircraft closet comprising:
   a plurality of support rails for supporting the closet, wherein the plurality of support rails has a plurality of connecting elements, wherein tops of the plurality of support rails are connected to a crown of a passenger compartment in an aircraft structure in an aircraft;
   a light engaged to a first portion of a first set of connecting elements of an interior of a selected support rail by a first set of tabs;
   a raceway engaged to a second portion of the first set of connecting elements for the selected support rail by a second set of tabs on the raceway;
   a rub strip engaged to a third set of connecting elements on an exterior of the selected support rail by a third set of tabs on the rub strip to cover the selected support rail from view;
   a hinge unit having a shape connected to the selected support rail;
   a wall panel connected to the selected support rail and to another support rail in the plurality of support rails;
   a door attached to the hinge unit; and
   a switch to turn on the light when the door is opened and to turn off the light when the door is closed, wherein the plurality of connecting elements are holes receiving the first set of tabs, the second set of tabs, and the third set of tabs; wherein the light has a lip on a first end extending above a surface of the first end, and wherein the lip covers a seam formed between the raceway and the light when the raceway is adjacent to the first end.

\* \* \* \* \*